United States Patent [19]

Vierling et al.

[11] 3,977,365
[45] Aug. 31, 1976

[54] METHOD OF OXIDIZING FUELS

[76] Inventors: Donald E. Vierling, 1016 Cochran Road, Pittsburgh, Pa. 15243; Howard S. Orr, 2080 Outlook Drive, Pittsburgh, Pa. 15241

[22] Filed: Aug. 6, 1973

[21] Appl. No.: 386,211

[52] U.S. Cl. .................................. 123/3; 123/1 A
[51] Int. Cl.² ................................... F02B 51/00
[58] Field of Search ............... 431/2, 5, 12, 76; 123/1 A, 119 E, 3, DIG. 12

[56] References Cited
UNITED STATES PATENTS

| | | | |
|---|---|---|---|
| 1,380,183 | 5/1921 | Boisen | 123/DIG. 12 |
| 2,376,479 | 5/1945 | Fehling | 123/119 E |
| 2,554,263 | 5/1951 | Nelson | 252/373 X |
| 3,425,402 | 2/1969 | Reisacher | 123/119 E |
| 3,451,949 | 6/1969 | Topsoe et al. | 48/196 R |
| 3,459,953 | 8/1969 | Hughes et al. | 123/119 E |
| 3,608,529 | 9/1971 | Smith et al. | 123/1 A |
| 3,709,203 | 1/1973 | Cettin et al. | 123/1 A X |
| 3,817,232 | 6/1974 | Nakajima et al. | 123/119 A |
| 3,828,736 | 8/1974 | Koch | 123/1 A |
| 3,972,690 | 2/1974 | Cooper | 123/3 |

FOREIGN PATENTS OR APPLICATIONS

| | | | |
|---|---|---|---|
| 353,570 | 7/1931 | United Kingdom | 123/DIG. 12 |

*Primary Examiner*—Charles J. Myhre
*Assistant Examiner*—William C. Anderson
*Attorney, Agent, or Firm*—Martin J. Carroll

[57] ABSTRACT

Fuels, such as gasoline, are oxidized in a combustion chamber, such as an automobile engine, with a substantial reduction in the amount of toxic materials (nitric oxide, carbon monoxide and unburned hydrocarbons) formed. A mixture of oxygen and inert gases combine with the gasoline in a proportional mixer, the amount of nitrogen not exceeding 70% by weight of the mixture. In the preferred embodiment the oxygen is supplied partially from air and partially from a separate oxygen tank while the inert gases are partially the nitrogen from the air and the remaining exhaust gases from the engine.

4 Claims, 2 Drawing Figures

METHOD OF OXIDIZING FUELS

This invention relates to a method of oxidizing fuels such as hydrocarbons, hydrogen, carbon and carbon monoxide and more particularly to burning gasoline in an automobile engine with a reduction in the amount of toxic substances produced. It is well known that toxic nitric oxides are formed when fuels are oxidized in the presence of air. When hydrocarbons are oxidized other toxic substances, particularly carbon monoxide and unburned hydrocarbons are also usually formed. The situation is such that legal standards have been adopted by the United States Government limiting the percentage of nitric oxides, carbon monoxide and unburned hydrocarbons which may be discharged from automobile engines to the air. To meet these standards numerous devices have been proposed and some have been installed on automobiles. Those of which I have knowledge consist mainly of catalysts and filters which are costly to install and maintain. In addition they reduce the engine efficiency so that the gasoline consumption per mile increases as much as 50%. Thus the reduction in air pollution is much less than hoped for and the energy crisis is expanded.

It is therefore an object of our invention to provide a method of oxidizing hydrocarbons, particularly in a gasoline engine, which reduces the total amount as well as the percentage of toxic materials produced without reducing engine efficiency.

This and other objects will become more apparent after referring to the following specification and drawings, in which.

Figure 1:
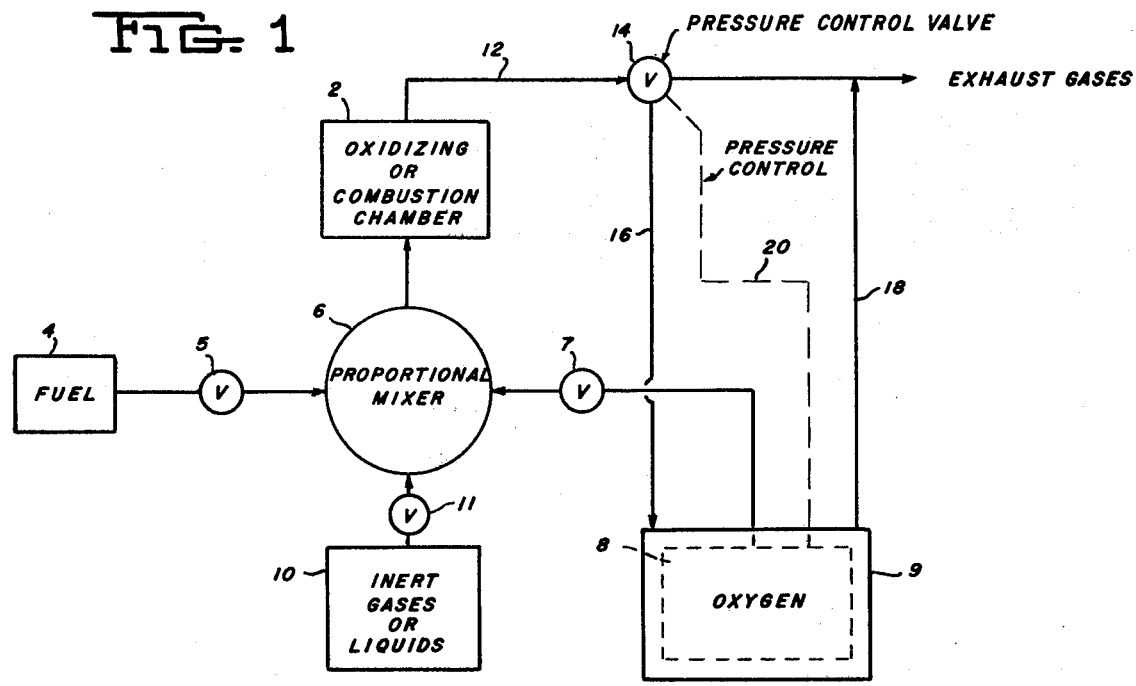
FIG. 1 is a schematic view of one embodiment of my invention.

Referring more particularly to FIG. 1 of the drawings, reference numeral 2 indicates an oxidizing or combustion chamber, such as a gasoline engine. Fuel, such as gasoline, is fed from a tank 4 through valve 5 to a proportional mixer 6. Commercially pure oxygen is also fed to the mixer 6 through valve 7 from an oxygen storage tank 8, having a heating chamber 9 which is used to vaporize the oxygen when it is in liquid form. Inert gases, such as carbon dioxide, argon, krypton or steam, are also fed to mixer 6 from a tank 10 through valve 11. These substances may be in liquid or gaseous form in tank 10, but usually will be gasified before going into the mixer. Exhaust gases pass from chamber 2 through a conduit 12. A pressure control valve 14 in conduit 12 bypasses part of the hot exhaust gases from conduit 12 to the heating chamber 9 of tank 8 through conduits 16 and 18 in order to vaporize the oxygen. The operation of valve 14 is controlled by a pressure control line 20 leading from the tank 8.

In operation, the mixer 6 and the flow of fuel, oxygen and inert gases thereto are adjusted so that the amount of nitric oxide in the exhaust gases will be within acceptable limits and so that the heat produced in chamber 2 will be sufficiently low to prevent deterioration of the chamber. The fuel-oxygen ratio is adjusted so that most of the fuel will burn to carbon dioxide and steam. It is preferred that the nitric oxide be completely eliminated but under present standards a maximum of 70% nitrogen by weight of the mixture of oxygen and inert gases may be present in that mixture. The term "inert gases" is used to include those substances other than the fuel and oxygen. The engine is started in operation. If the oxygen pressure in tank 8 is below a predetermined amount, valve 14 will open to bypass sufficient exhaust gases to vaporize enough oxygen to mix with the fuel. If the pressure in tank 8 rises above a predetermined amount the valve 14 will close.

Figure 2:
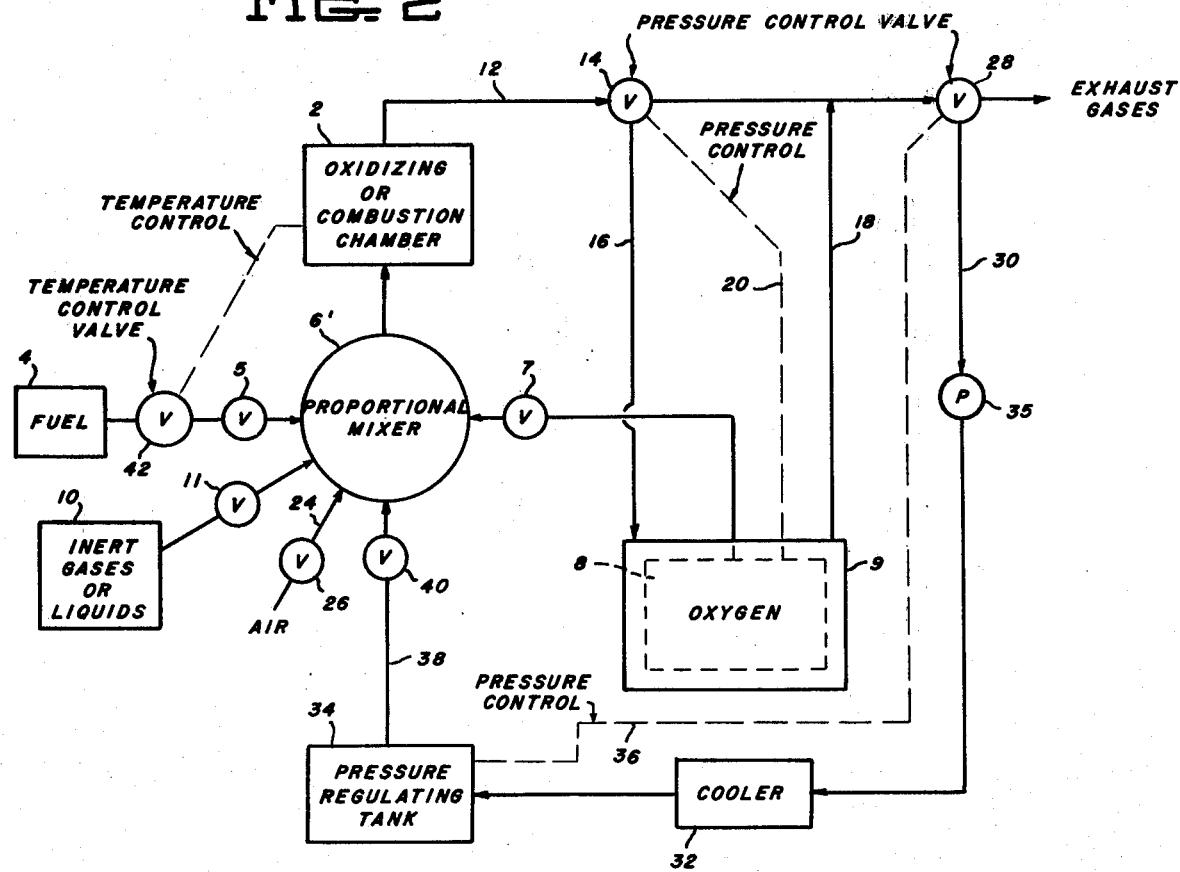
FIG. 2 is a view, similar to FIG. 1, showing another embodiment of my invention.

The apparatus of FIG. 2 may be used in several different ways. It includes all the elements of FIG. 1 which are indicated by the same reference numerals as in FIG. 1. An air conduit 24 with a shut-off valve 26 therein leads to the mixer 6'. A pressure control valve 28 in conduit 12 controls flow of exhaust gases through conduit 30 and cooler 32 to a tank 34. A pump 35 is installed in conduit 30 to obtain the desired pressure. Pressure in tank 34 controls operation of valve 28 through lead 36. A conduit 38 having a shut-off valve 40 therein leads from tank 34 to mixer 6'. If desired, the flow of the fuel may be controlled by a temperature controller 42 operated by the temperature in chamber 2 to prevent overheating.

In the preferred operation of the apparatus of FIG. 2 valve 11 is closed and valves 26 and 40 opened. The mixer 6' and the flow of fuel, oxygen, air and exhaust gases thereto adjusted in a manner similar to that in FIG. 1. To suit present standards the mixture of air, oxygen and exhaust gases which are substantially inert may be in the proportions of 85%, 4% and 11% by weight. For stricter standards these proportions can be changed to 25% air, 16% oxygen and 59% exhaust gases. It will be seen that in this operation the inert gases are partially in the form of nitrogen and partially in the form of exhaust gases, while part of the oxygen is supplied in the air. This method of operation is preferred since no separate source of inert gases is necessary and a large proportion of the oxygen is supplied from the air. In addition if the fuel is not completely burned it will be recycled through the chamber 2, thus giving it additional chances to burn and reducing the amount of carbon monoxide and unburned hydrocarbons exhausted to the atmosphere.

A second way of operation of FIG. 2 is to close valves 11 and 26 and open valve 40. This has many of the advantages of the first way of operation, but does require that all the oxygen be supplied from tank 8. While this eliminates all the nitric oxides it is more expensive because of the additional oxygen cost.

A third way of operation of FIG. 2 is to close valve 26 and open valves 11 and 40. Thus part of the inert gases are from a separate source and part from the exhaust gases.

A further way of operation of FIG. 2 is to open valves 11, 26 and 40. Thus part of the inert gases are from air, part from exhaust gases and part from a separate source, and part of the oxygen is from the air.

While several embodiments of our invention have been shown and described, it will be apparent that other adaptations and modifications may be made without departing from the scope of the following claims.

We claim:

1. The method of substantially completely oxidizing a fuel in an engine having a combustion chamber which comprises adding to said fuel a mixture of oxygen, air and exhaust gases, individually controlling the flow of oxygen, air and exhaust gases, so as to provide a mixture in which the proportions by weight are between 4 and 16% oxygen, between 85 and 25% air, and between 11 and 59% exhaust gases from said combustion chamber, feeding said fuel and controlled mixture to said combustion chamber and burning the fuel and mixture therein, and continuing addition of said fuel and controlled mixture to said combustion chamber during substantially all operation of said engine.

2. The method of claim 1 in which the fuel is hydrogen.

3. The method of claim 1 in which the fuel is of the class consisting of hydrocarbons, hydrogen, carbon and carbon monoxide.

4. The method of claim 3 in which the fuel is hydrogen.

* * * * *